United States Patent
Blossom et al.

[15] 3,655,451
[45] Apr. 11, 1972

[54] METHOD OF MAKING AN ALKALINE IMPREGNATED ELECTRODE

[72] Inventors: Raymond W. Blossom, Brooklyn; Allen Charkey, Flushing, both of N.Y.

[73] Assignee: Yardney International Corp., New York, N.Y.

[22] Filed: Apr. 14, 1969

[21] Appl. No.: 816,077

[52] U.S. Cl. ................................................136/126, 136/31
[51] Int. Cl. ...................................H01m 13/08, H01m 43/02
[58] Field of Search..............136/120 B, 120 R, 30, 31, 125, 136/126; 264/111

[56] References Cited

UNITED STATES PATENTS

| | | | |
|---|---|---|---|
| 3,432,354 | 3/1969 | Jost | 136/86 |
| 3,434,831 | 3/1969 | Knopp | 75/224 |
| 3,471,330 | 10/1969 | Berger et al. | 136/6 |

FOREIGN PATENTS OR APPLICATIONS

| | | | |
|---|---|---|---|
| 813,408 | 5/1969 | Great Britain | 136/30 |

*Primary Examiner*—Winston A. Douglas
*Assistant Examiner*—M. J. Andrews
*Attorney*—Karl F. Ross and Herbert Dubuo

[57] ABSTRACT

An improved method is described for manufacturing an electrode impregnated with potassium hydroxide. Potassium hydroxide in powder form having a low content of water is mixed with the anode metal in powder form and blended to form a coherent mixture. The mixture is spread over a conductive grid, subjected to a pressing operation to form a unitary structure of the desired electrode shape and then heated in the absence of air. The electrode is then stored in an airtight container. A strong KOH-impregnated metal anode capable of long storage is obtained.

4 Claims, No Drawings

METHOD MAKING AN ALKALINE IMPREGNATED ELECTRODE

In the manufacture of primary cells where quick activation is needed, several methods have been proposed for impregnating a zinc electrode with a potassium hydroxide electrolyte by immersing the completely formed zinc electrode in an alkaline solution. Thereafter, it is dried and placed in either cold storage or some closed environment devoid of water vapor to obtain a long-lasting electrode. However, it has been found that, during manufacture, these electrodes tend to be pyrophoric and will spontaneously burst into flame. In commonly assigned co-pending and now abandoned application Ser. No. 701,066 filed Jan. 29, 1968 by one of us, Allen Charkey an alternate method for manufacturing such electrodes has been described wherein potassium hydroxide, in powder form, is mixed with zinc, in powder form, spread over a conductive grid and subjected to a pressing operation to form the desired electrode shape.

This method avoided the pyrophoric stage and provided usable electrodes.

The general object of our invention is to provide an improvement of this latter method to produce stronger electrodes which are resistant to spalling on being flexed.

It is another object of this invention to provide a method of making, without encountering the danger of pyrophoric combustion, an electrode impregnated with dry electrolyte and sufficiently rugged and mechanically strong to permit easy handling and insertion into zinc-fueled air cells.

Zinc powder suitable for use in the practice of our invention has a bulk--;density between 0.4 and 0.7 grams per cubic centimeter. Such zinc powders, having particles sizes of -100 to 200 mesh, may be purchased on the open market.

The potassium hydroxide powder useful the practice of our invention may be purchased on the open market and should contain a very low amount of water. A preferable range is between 5 and 7 percent of $H_2O$ by weight. It has been found that moisture contents of less than 3.5 percent should be avoided. Such substantially anhydrous KOH tends to cause caking and is difficult to repulverize. On the other hand, KOH powders with water contents of 10 percent or greater render the zinc/KOH mixture too pyrophoric. When handling this potassium hydroxide powder and the zinc/KOH mixture, safety precaution such as safety glasses and dust masks are recommended. Since KOH is very hygroscopic, it should be carefully stored to maintain the moisture range within the limits of 3.5 to 10 percent by weight.

In the preparation of the electrode, KOH in powder form is mixed with zinc in powder form. The ratio of KOH to zinc powder may be from 0.15 to 0.25 grams of KOH for each gram of zinc powder and preferably is above 0.23 grams. The zinc and KOH powders are well blended either by handmixing, by tumbling the powders or by large-scale blending equipment. The amount of KOH mixed with the zinc powder depends to some extent upon the desired concentration of the electrolyte after the addition of water in a battery system. In a battery of given configuration, the space available for the electrolyte also influences the amount of KOH. Too little KOH will prevent proper functioning of the electrolyte. On the other hand, too much admixed KOH tends to render the electrode too brittle and of course reduces the amount of zinc available in the anode. A compromise must then be reached, keeping in mind these considerations. The amount of dry KOH added to the plate is such that the final concentration of electrolyte in the assembled cell of any configuration will be between 20 and 45 percent aqueous KOH. This means that the ratio of 0.015 to 0.25 grams of KOH per gram of zinc set forth above is useful for zinc-air cell having limited quantity of free electrolyte, e.g. a cell having 32 cc of electrolyte volume with 29.5 cc of zinc-electrode volume. In other configurations suitable adjustments are required.

The electrodes are fabricated by cold-pressing the composite Zn/KOH mixture on a supporting grid at various pressures. The grid may be made of expanded-metal meshes of copper, silver, or cold-rolled steel having 40-60 percent open area and 5-10 mil thickness. The mixture is evenly distributed into the grid and the composite is compressed at a pressure ranging, in a typical situation, from 4 to 10 tons per square inch. The preferable range is about 4.4 to 5.0 tons per square inch. The final density of the pressed electrode is approximately 2.2 grams per cubic centimeter. Since this compacted mass includes KOH, the addition of water which will dissolve the KOH renders the density of the zinc plate in the activated cell substantially lower. Thus, the zinc density is computed to provide the optimum of 1.8 grams per cubic centimeter in situ. KOH impregnated zinc plates having thicknesses from 0.020 to 0.0200 inches have been made for the above-described cells having a 32 cc electrolyte volume.

After compression, the dry plates are placed in an oven provided with a non-oxidizing atmosphere such as vacuum, nitrogen, hydrogen or argon, and are heated at temperatures in the range of 200°–400° F, for a period of time sufficient to agglomerate the particles and bind them together with the water contained in the KOH powder acting as a binder. At the higher temperature, 10 minutes is sufficient to develop the strength of the electrode. At lower temperatures correspondingly longer times are necessary, but below 200° F either the reaction of the interstitial water is not started or the time required is too long for practical purposes, (in excess of 1½ hours).

Following the heating treatment, the plates are sealed in moistureproof composite bags made from craft paper, aluminum or polyethylene depending upon the desired storage time between electrode manufacture and complete battery fabrication or electrode insertion. It has been found that electrodes prepared from such Zn/KOH powder mixtures can be left exposed in air from 1 to 2 hours depending on the relative humidity. As a practical matter, however, pyrophoric conditions may arise when the KOH absorbs in excess of 10 percent of water. Since oxidation of the plates is initiated after they have been exposed for more than the stated periods and proceeds rapidly until the electrodes may ignite, sealing of the electrode must be completed before the specified time. The exact correlation between the rate of moisture pick-up leading to pyrophoric electrode oxidation and the relative ambient humidity has not been established. However, it has been observed that on days when the humidity is less than 40 percent, the plates can be exposed for about 2 hours. On days when the humidity is high, for instance greater than 60 percent, the plates should not be exposed to the air for more than 1 hour. Plate oxidation is best minimized by drying the atmosphere in the locale where the mixing, pressing, heat-treating and sealing operations are conducted.

The performance of the above-described composite electrodes was evaluated with good results.

In a typical example, the electrode for a cell was made by blending 30 grams of zinc powder with 7.4 grams of KOH powder, mold-pressing to a density of approximately 2.2 grams per cubic centimeter and a thickness of 0.2 inches and subsequently heating at 300° F. for 20 minutes in a nitrogen-flushed oven. Sample electrodes were compared with electrodes prepared according to the process of prior application Ser. no. 701,066. It was found that the heat-treated electrodes of this invention had much greater tensile strength, compressive strength and resistance to flexure. In addition, when subjected to vibration tests, the electrodes of this invention survived frequencies and amplitudes that destroyed the referenced samples. The electrodes were then inserted into 12 mils pellon separator bags and placed in an air cell having a 12-square-inch cathode area. The cell was activated with 14 cc of distilled water and discharged immediately at rates of 2.5 amperes and 5.0 amperes. At these discharges the respective plateau voltages were 1.06 and 1.02 volts, yielding further respective storage capacities of 13.7 and 12.9 ampere hours. The zinc utilization was respectively 2.33 and 2.45 grams per ampere-hour. Statistically these performance data were identical with the unheated electrodes of the prior disclosure referred to.

Having thus described our invention, We realize that variations may be encountered and yet fall within the scope of the following claims. Particularly it should be mentioned that cadmium, barium, and even lithium and calcium, as well as iron, tin, led etc. may be substituted for zinc as the anode material. Similarly certain alloys, particularly of magnesium, have also been proposed for use with alkaline electrolytes and particularly with KOH in aqueous and non-aqueous systems. Preparing such composite electrodes of these metals with KOH is within the ambit of our invention.

In a like fashion, where the performance parameters permit, NaOH and LiOH may be substituted completely or in part for the KOH as long as the moisture contents are maintained below the pyrophoric levels but within levels where the interstitial moisture will, on heat treatment, form the strong interparticulate bonds which characterize in the electrodes of this invention.

I claim:

1. A method of making a zinc electrode impregnated with dry potassium hydroxide, said electrode tending to become pyrophoric by the absorption of water, without encountering the danger or pyrophoric combustion, comprising the steps of forming a mixture of zinc powder with potassium hydroxide in the form of a powder having a water content within the range of 3.5 to 10 percent by weight, compacting said mixture to form a plate, heat treating said plate in a nonoxidizing atmosphere at a temperature within the range of substantially 200° to 400° F. to form an electrode body and storing said body in a moistureproof envelope to insulate said body from contact with the ambient atmosphere, thereby maintaining the moisture content of said potassium hydroxide within said range.

2. A method as defined in claim 1 wherein said water-content range extends between substantially 5 and 7 percent by weight.

3. A method as defined in claim 1 wherein said electrode material is zinc in a proportion of 0.15 to 0.25 grams of KOH per gram of zinc powder.

4. A method as defined in claim 3 wherein the proportion of KOH in said mixture is above 0.23 grams per gram of zinc powder.

* * * * *